United States Patent [19]

Snider

[11] 4,091,763
[45] May 30, 1978

[54] TEMPERATURE INDICATOR

[75] Inventor: Harold F. Snider, Mansfield, Ohio

[73] Assignee: Therm-O-Disc Incorporated, Mansfield, Ohio

[21] Appl. No.: 756,812

[22] Filed: Jan. 5, 1977

[51] Int. Cl.$^2$ ............................................. G01K 5/68
[52] U.S. Cl. ................................. 116/114.5; 73/378.3
[58] Field of Search ............................ 73/378.3, 363.5; 116/114.5, 114 R; 426/88

[56] References Cited

U.S. PATENT DOCUMENTS

| 2,368,193 | 1/1945 | Boynton | 73/378.3 |
| 2,562,685 | 7/1951 | Adams | 73/378.3 |
| 3,602,186 | 8/1971 | Popenoe | 73/88 F |

Primary Examiner—S. Clement Swisher
Assistant Examiner—Denis E. Corr

Attorney, Agent, or Firm—McNenny, Pearne, Gordon, Gail, Dickinson & Schiller

[57] ABSTRACT

A temperature indicator is disclosed which includes a housing providing a transparent window. A bimetal snap disc is located in the housing and is movable from a position spaced from the window to a position immediately adjacent to the window upon reaching a predetermined temperature. The housing includes an opaque fluid which obscures the face of the snap disc from view through the window when it is spaced from the window but allows viewing of the face of the snap disc when immediately adjacent to the window. A suitable indicia is provided on the snap disc which provides an indication that the snap disc has operated by being exposed to the critical temperature. The snap disc is arranged so that it remains in the operated position after being exposed to the critical temperature involved.

16 Claims, 4 Drawing Figures

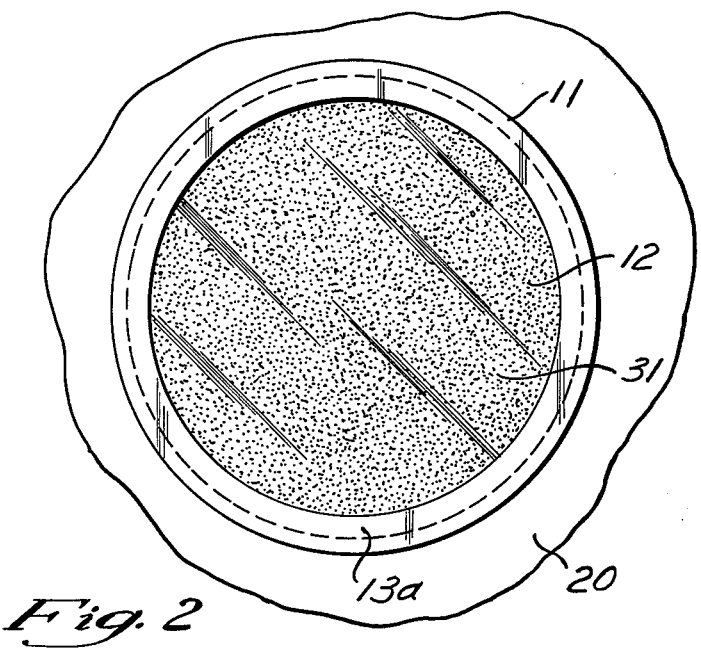
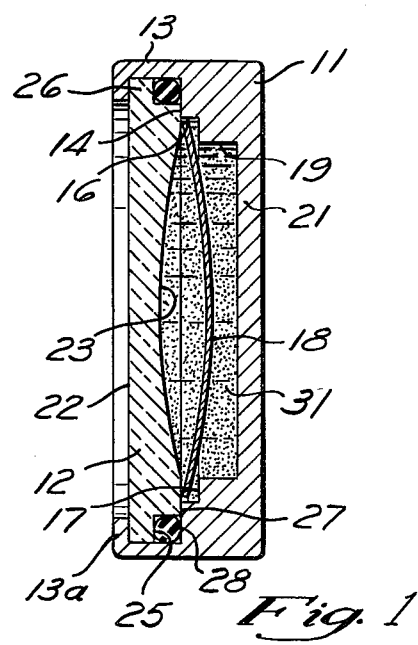
Fig. 2
Fig. 1
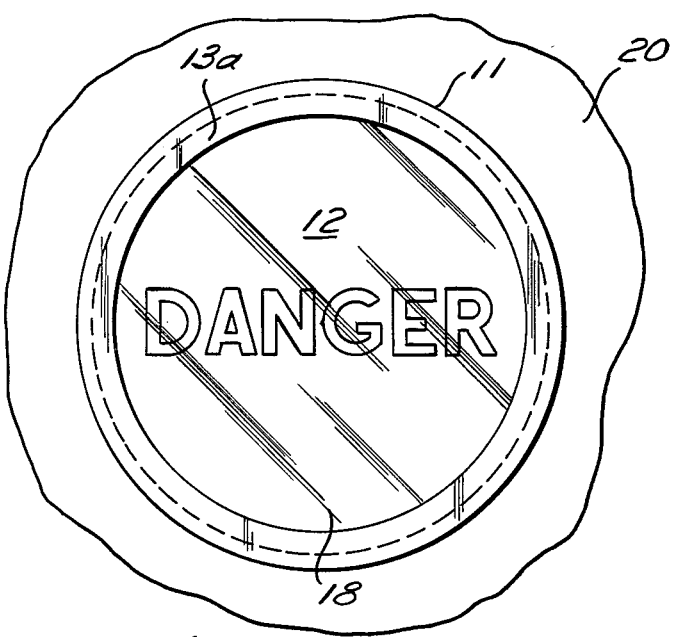
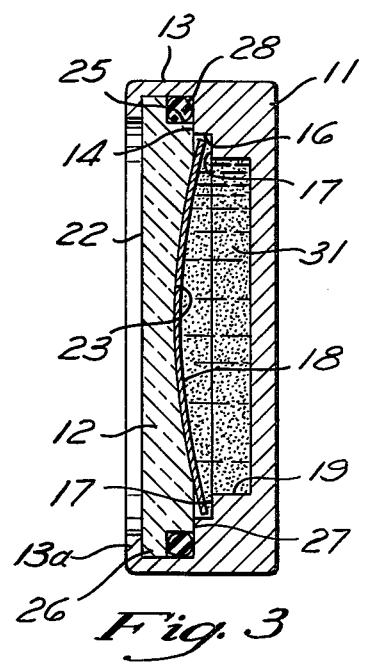
Fig. 4
Fig. 3

TEMPERATURE INDICATOR

BACKGROUND OF THE INVENTION

This invention relates generally to thermostatic devices and more particularly to a novel and improved low cost visual temperature indicator which reliably and accurately indicates exposure to a predetermined temperature.

PRIOR ART

Temperature indicators are sometimes attached to packages or devices to indicate whether or not such package or device has reached some predetermined critical temperature. For example, perishable products such as frozen foods should be maintained frozen during storage and handling to insure that the food does not thaw and spoil. In some instances a package may thaw for a period of time and then be refrozen after spoilage has occurred. If an indicator is not provided to establish an indication that thawing has occurred, there is a danger that the spoiled food will be used. Indicator devices for such purposes are described in the U.S. Pat. Nos. 3,214,278 dated Oct. 26, 1965 and 3,967,579 dated July 6, 1976.

The U.S. Pat. Nos. 3,877,411 dated Apr. 15, 1975; 3,965,741 dated June 29, 1976 and 3,971,333 dated July 27, 1976, also disclose temperature indicators which provide a permanent indication of exposure to some predetermined temperature condition.

SUMMARY OF THE INVENTION

The present invention provides a low cost temperature indicator which is reliable and accurate. The illustrated embodiment employs a bimetal snap disc shaped to provide two positions of stability and which is operable to snap from one position to the other position upon reaching a predetermined operating temperature.

Such snap discs are well known for use in various types of thermostatic devices and can be manufactured for accurate operation at low cost. In the illustrated embodiment the snap disc is contained within a chamber in a simple housing assembly which provides a transparent wall or window. The housing is shaped so that one side of the disc is positioned against or immediately adjacent to the window when the disc is in one position of stability and is spaced from the window when the disc is in its other position of stability. An opaque fluid fills the chamber and operates to obscure the disc from view through the window except when the disc is immediately adjacent the viewing window.

The bimetal snap disc is manufactured and calibrated so that it remains in the position spaced from the window so long as the disc is not exposed to the critical temperature involved. Upon reaching the critical condition the disc snaps through from a position spaced from the window to a position immediately adjacent to the window where it is not obscured from view by the opaque fluid. A suitable indicia such as the word "DANGER" is printed on the side of the disc and is visible through the window to indicate that the device and the package or material to which the device is attached has been exposed to the critical temperature. The disc is manufactured so that it will not snap back to its original position under any environmental temperature to which the disc will be exposed. Consequently, it provides a permanent indication that the disc has reached the critical operating temperature.

Because of its accuracy and reliability a temperature indicator in accordance with the present invention can be used with organs intended for use in human transplant operations such as kidney transplants to provide a positive indication that the organ has been maintained at proper storage temperature for the entire period before its use in a transplant operation.

BRIEF DESCRIPTION OF THE DRAWINGS

FIG. 1 is a side elevation in cross section illustrating one preferred embodiment of the present invention with the snap disc in its position of stability spaced from the viewing window in which the indicia printed on the disc is obscured by the opaque fluid;

FIG. 2 is a side view illustrating the viewing window when the snap disc is in the position of FIG. 1 and is obscured by the fluid;

FIG. 3 is a side elevation in cross section similar to FIG. 1 but illustrating the position of the disc after it has been exposed to critical temperature and has snapped through to a position adjacent to the viewing window; and FIG. 4 is a side view illustrating the appearance of the device after the disc is operated to the position illustrated in FIG. 3 in which the word "DANGER" printed on the disc is visible through the viewing window.

DETAILED DESCRIPTION OF THE DRAWINGS

The preferred embodiment of the present invention includes a housing assembly consisting of two parts. Namely, a cup shaped metal housing member 11 and a transparent molded window member 12. The housing member 11 is preferably formed as a die cast or impact extrusion part and the window 12 molded of a transparent material such as an acrylic plastic.

The housing member 11 of the illustrated embodiment is generally cylindrical in shape and provides a relatively thin cylindrical flange portion 13 which extends to a radial window locating face 14. Inwardly from the face 14 the housing member 11 is formed with a cylindrical wall 16 which extends from the radial face 14 to a second radial face 17. The face 17 cooperates with the window member 12 to locate the periphery of a bimetal snap disc 18. The housing member 11 is also provided with a cylindrical wall 19 extending from the disc locating face 17 to an end wall 21. In FIGS. 2 and 4 the indicator is illustrated attached to a package 20 which contains, for example, an organ for transplant.

The window member 12 is formed with a forward or exterior face 22 and a concave rearward face 23 provided with a curvature substantially matching the curvature of the disc 18 when the disc is in the position of FIG. 3. It should be recognized that in the drawings the amount of curvature of the disc 18 and the rearward face 23 of the window member 12 is greatly exaggerated for purposes of illustration and that in practice bimetal snap discs do not provide such large amounts of curvature. For example, a bimetal snap disc having a diameter of one half of an inch has a curvature such that the amount of movement of the center section of the disc between the two positions of FIGS. 1 and 3 is in the order of 0.010 to 0.015 inches.

The window member 12 is formed with a peripheral flange 26 proportioned to closely fit the inner wall of the flange 13 and a locating radial wall 27 which seats against the radial wall 14 to limit movement of the window member with respect to the housing member 11. A stepped portion 25 is formed in the window member 12 to receive an O-ring type seal 28. Permanent assembly is provided by bending the flange 13 inwardly as indicated at 13a. The spacing between the end wall 28 and the radial face 17 is proportioned so that the disc 18 is loosely trapped and retained at its periphery in the position of FIG. 1 when in the position of stability illustrated in such figure. However, the radial wall 17 is located with respect to the rearward surface 23 to insure that the disc fits substantially against the rearward face 23 when the disc is operated to the position of FIG. 3.

The two housing members 11 and 12 and the seal 28 cooperate to define a cavity in which the snap disc 18 is located and such cavity is filled with an opaque fluid 31 indicated by the random dots in the drawings. Such fluid is selected to be sufficiently opaque to obscure the disc 18 and any indicia printed thereon from view through the window member 12 when the disc is in the position of stability illustrated in FIG. 1. However, when the disc snaps from the position of stability of FIG. 1 to the operated position of stability as illustrated in FIG. 3, the opaque fluid is displaced around the periphery of the disc to the portion of the chamber remote from the window member 12 and the disc becomes visible through the window. Preferably, the disc is provided with indicia or color which will make it readily apparent that the disc is operated to indicate that the indicator device has been exposed to the operating temperature of the disc. In the illustrated embodiment the word "DANGER" is printed on the disc and is fully visible as illustrated in FIG. 4 after the disc has snapped through to its operated position of stability.

Any suitable fluid may be utilized for the opaque fluid 31. However, one suitable fluid for use in devices intended for exposure to low temperatures consist of a mixture of water and alcohol to prevent freezing of the fluid. In such liquid, a pigment such as india ink is added to provide the opaque quality to the fluid.

Excessive pressures do not occur so long as the liquid does not have a boiling point within the temperature range to be encountered partially because the volume of the cavity expands on increasing temperature as the fluid within the body expands. Further, the amount of fluid contained within the cavity is relatively small and any difference in volumetric expansion between the fluid and the cavity can be accommodated by a slight bulging of the window member 12 and the rearward wall 21.

Typicl bimetal snap discs have two operating temperatures. At one temperature the disc operates from a first position of stability to the second position of stability and at the other operating temperature the disc snaps back to the first position of stability. The difference between these two temperatures is normally referred to as the differential temperature. When the present indicator is intended to provide a permanent indication of exposure to the critical temperature the disc is manufactured so that it operates from the position of stability of FIG. 1 to the position of stability of FIG. 2 upon reaching the critical temperature involved in the use of the indicator and is formed with sufficient differential temperature so that the other operating temperature is outside of the range of temperatures expected to be encountered in the environment. Therefore, once the disc operates to indicate reaching the critical or calibration temperature it remains in the operated condition of FIG. 3 and does not return to the position of FIG. 1. Therefore, the indicator provides a permanent indication that the indicator has been exposed to the critical temperature involved.

With an indicator in accordance with the present invention, a device is provided which can be manufactured at very low cost while still maintaining accuracy and reliability. The indicator is also relatively immune to damage by normal wear and tear. However, the device is fail safe in that if it is subjected to sufficient abuse to cause damage, the fluid will leak out of the indicator and cause the indicia to be visible even if the disc is in the position of FIG. 1. Therefore, there is substantially no possibility of damage to the device being unnoticed.

Although a preferred embodiment of this invention is illustrated it is to be understood that various modifications and rearrangements may be resorted to without departing from the scope of the invention disclosed and claimed.

I claim:

1. A visual temperature indicator comprising housing assembly defining a chamber and providing a transparent window, a shallow curved dished shaped bimetal snap disc in said chamber movable between two positions of stability and opposite curvature in response to predetermined temperatures, said disc being located adjacent to said window in one of said positions of stability and paced therefrom in the other of said positions of stability, said window being formed with a shallow concaved inner surface substantially fitting the curvature of said disc when said disc is in said one position and visual control means permitting said disc to be visible through said window when said disc is in said one position of stability and obscuring said disc from view through said window when said disc is in said other position of stability.

2. A visual temperature indicator as set forth in claim 1 wherein said visual control means is an opaque fluid which is located between said disc and said window when said disc is in said other position of stability to obscure said disc from view through said window.

3. A visual temperature indicator as set forth in claim 2 wherein movement of said disc from said other position of stability to said one position of stability displaced said fluid from between said disc and window and causes said disc to be visible through said window.

4. A visual temperature indicator as set forth in claim 3 for use in a system having a predetermined critical temperature, and said disc moves to said one position of stability upon reaching said predetermined critical temperature.

5. A visual temperature indicator as set forth in claim 4 wherein said disc is structured to remain in said one position of stability after being exposed to said predetermined critical temperature to provide a permanent indication of such exposure.

6. A visual temperature indicator as set forth in claim 5 wherein said disc is provided with indicia which is visible through said window when said disc is in said one position of stability.

7. A visual temperature indicator as set forth in claim 5 wherein said chamber is sealed and is filled with said opaque fluid.

8. A visual temperature indicator as set forth in claim 2 wherein said chamber is sealed and is filled with said opaque fluid.

9. A visual temperature indicator as set forth in claim 7 wherein said opaque fluid is a liquid having a boiling point above the temperature to be encountered, and said housing assembly has sufficient flexibility to accommodate normal thermal expansion of said liquid.

10. A visual indicator as set forth in claim 9 wherein said fluid is a mixture of water and alcohol containing a die to render it opaque.

11. A visual temperature indicator as set forth in claim 1 wherein said housing assembly includes a cup shaped member and a transparent window member cooperating to define said chamber, said cup shaped member and window member providing opposed surfaces cooperating to trap said disc at its periphery and properly locate said disc in said chamber.

12. A visual temperature indicator as set forth in claim 11 wherein said cup shaped member and window member are formed with engaging locating surfaces which locate one member with respect to the other.

13. A visual temperature indicator as set forth in claim 12 wherein said members are permanently sealed together.

14. A visual temperature indicator as set forth in claim 13 wherein said members are sealed by a resilient seal.

15. A temperature indicator comprising a body assembly enlcosing a chamber and providing a transparent window, a shallow curved dished shaped bimetal snap disc in said chamber having two positions of stability of opposite curvature and being movable from said first position of stability to said second position of stability upon reaching a predetermined temperature, one side of said disc being located adjacent to said transparent window in one of said positions of stability and spaced therefrom in the other of said positions of stability, said window being formed with a shallow concaved inner surface substantially fitting the curvature of said disc when said disc is in said one position of stability, and an opaque fluid in said chamber, said one side of said disc being provided with indicia which is visible through said transparent window when said disc is in said one position of stability and obscured from view through said transparent window by said opaque fluid when said disc is in said other position of stability.

16. In combination a package of material which must for proper storage be maintained at a temperature different than a critical temperature, a visual temperature indicator on said package, said visual temperature indicator including a housing assembly defining an enclosed chamber and providing a transparent window, a shallow curved dished shaped bimetal snap disc having two positions of stability and opposite curvature and being movable to one of said positions of stability in response to exposure to said critical temperature and visual control means permitting said disc to be visible through said window when said disc is in said one position of stability and obscuring said disc from view through said window when said disc is in said other position of stability, said window being formed with a shallow concaved inner surface substantially fitting the curvature of said disc when said disc is in said one position, said disc being positioned in said other position of stability and being structured to move to said one position and remain in said one position after being exposed to said critical temperature.

* * * * *